(12) United States Patent
Kingdom et al.

(10) Patent No.: US 6,244,790 B1
(45) Date of Patent: *Jun. 12, 2001

(54) TOOL AND INSERT FOR CHIP REMOVAL MACHINING

(75) Inventors: Mike J. Kingdom, Warwickshire (GB); Matti Niemi, Fagersta (SE)

(73) Assignee: Seco Tools AB, Fagersta (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/849,616
(22) PCT Filed: Nov. 25, 1995
(86) PCT No.: PCT/SE95/01421
§ 371 Date: Aug. 28, 1997
§ 102(e) Date: Aug. 28, 1997
(87) PCT Pub. No.: WO96/17706
PCT Pub. Date: Jun. 13, 1996

(30) Foreign Application Priority Data
Dec. 8, 1994 (SE) .................................. 9404266

(51) Int. Cl.[7] .................................................. B23B 27/04
(52) U.S. Cl. ........................... 407/110; 407/108; 407/117
(58) Field of Search ................... 407/108–110, 113–117, 407/102, 47; 408/197

(56) References Cited

U.S. PATENT DOCUMENTS

| | | | |
|---|---|---|---|
| 1,681,675 | * | 8/1928 | Miller .................................. 407/110 |
| 2,134,410 | * | 10/1938 | Miller .................................. 407/110 |
| 2,779,992 | | 2/1957 | Hayes . |
| 3,889,331 | * | 6/1975 | Grungras ......................... 407/110 X |
| 3,894,322 | | 7/1975 | Pano . |
| 4,357,123 | | 11/1982 | Zweekly . |
| 4,588,333 | | 5/1986 | Gustafson . |
| 5,028,175 | * | 7/1991 | Pawlik .................................... 407/42 |
| 5,054,967 | | 10/1991 | Noguchi et al. . |
| 5,112,164 | * | 5/1992 | Pano ..................................... 407/110 |
| 5,156,502 | * | 10/1992 | Satran .................................. 407/110 |
| 5,211,516 | | 5/1993 | Kress et al. . |
| 5,360,298 | * | 11/1994 | Hedlund ............................... 407/110 |
| 5,423,639 | * | 6/1995 | Wiman .................................. 407/116 |
| 5,810,518 | * | 9/1998 | Wiman et al. ....................... 407/102 |
| 5,921,724 | * | 7/1999 | Erickson et al. ................. 407/109 X |
| 5,934,843 | * | 8/1999 | Brask et al. ..................... 407/109 X |
| 6,010,281 | * | 1/2000 | Coutat et al. .................... 407/109 X |

FOREIGN PATENT DOCUMENTS

| | | |
|---|---|---|
| 41 08 830 | 9/1992 | (DE) . |
| 89/11367 | 11/1989 | (WO) . |
| 95/29026 | 11/1995 | (WO) . |

* cited by examiner

*Primary Examiner*—Henry Tsai
(74) *Attorney, Agent, or Firm*—Burns, Doane, Swecker & Mathis, L.L.P.

(57) ABSTRACT

A tool for chip removing machining includes a holder and a cutting insert clamped within a pocket of the holder. The pocket has upper and lower sides, and the cutting insert comprises an upper surface and a lower surface. The upper side of the pocket and the upper surface of the cutting insert comprise first cooperating contact surfaces defining a first flank angle. The lower side of the pocket and the lower surface of the cutting insert comprise second cooperating contact surfaces which define a second flank angle. The first flank angle is larger than the second flank angle. The lower surface of the cutting insert and the lower side of the pocket form intermeshing projections and recesses which define the second contact surfaces.

11 Claims, 7 Drawing Sheets

Fig. 10

TOOL AND INSERT FOR CHIP REMOVAL MACHINING

THE FIELD OF THE INVENTION

The present invention relates to a tool and a cutting insert for chip removing machining, preferably for grooving or slot milling. The tool comprises a holder and a cutting insert. The holder comprises at least a cutting insert pocket, which has an upper side and a lower side. The cutting insert comprises an upper surface and a lower surface. The upper side of the cutting insert pocket and the upper surface of the cutting insert comprise first cooperating contact surfaces, which define a first flank angle. The lower side of the cutting insert pocket and the lower surface of the cutting insert comprise second cooperating contact surfaces, which defines at least a second flank angle.

PRIOR ART

In U.S. Pat. No. 5,112,164 there is, concisely, described a tool of the above mentioned type. The cutting insert and the holder have cooperating grooved surfaces, wherein the first and second flank angles are identical. With the known tool it is a danger that the cutting insert is inserted incorrectly, that may be the cutting insert can be inserted into the seat but incorrectly positioned in the lateral direction of the cutting insert. In addition, the known solution puts high demands on the manufacturing of the grooved parts.

Through a number of patents it is previously known to provide tools with cooperating grooves between the cutting insert and the holder. A common problem for these known tools is that the cutting insert can be incorrectly positioned in the holder.

OBJECTS OF THE INVENTION

One object of the present invention is to provide a rigid tool preferably for thin holders and cutting inserts.

Another object of the present invention is to provide a tool and a cutting insert in which the cutting insert cannot be incorrectly positioned.

Another object of the present invention is to provide a tool and a cutting insert where the advantage with grooves is combined with a relatively simple manufacturing.

Still another object of the present invention is to provide a tool and a cutting insert in which the cutting insert cannot be positioned obliquely even if one of the cooperative grooved surfaces are worn out.

Still another object of the present invention is to provide a tool and a cutting insert where the clamping force is distributed on such a large area that the cutting insert does not risk splitting.

Still another object of the present invention is to provide a tool and a cutting insert where twisting of the cutting insert under machining is avoided.

Still another object of the present invention is to provide a tool and a cutting insert with great resistance against extraction of the cutting insert from the holder.

Still another object of the present invention is to provide a tool and a cutting insert where the relative movement between cutting insert and the holder is negligible.

Still another object of the present invention is to provide a tool and a cutting insert where the cutting insert more easily is guided into the cutting insert pocket during mounting.

These and other objects have been achieved by a tool and a cutting insert as defined in the appended claims with reference to the drawings.

SUMMARY OF THE INVENTION

The present invention relates to a tool and a cutting insert for chip removing machining, preferably for grooving. The tool comprises a holder and a cutting insert. The holder comprises at least one cutting insert pocket, which has an upper side and a lower side. The cutting insert comprises an upper surface and a lower surface, wherein the upper side of the cutting insert pocket and the upper surface of the cutting insert comprise first cooperating contact surfaces, which define a first flank angle and wherein the lower side of the cutting insert pocket and the lower surface of the cutting insert comprise second cooperating contact surfaces, which define at least a second flank angle. The first flank angle, which defines the angle between the respective upper support surfaces on the cutting insert and the holder, is bigger than the second the flank angle, which defines the angle between the respective lower support surfaces on the cutting insert and the holder. The lower side of the cutting insert pocket and the lower surface of the cutting insert comprise projections and recesses which form the second contact surfaces. The cutting insert has side surfaces. A line of intersection between a side surface and the upper surface forms a cutting edge or two lines of intersection between the side surfaces and the upper surface form two cutting edges. The cutting insert is provided to be clamped firmly in the cutting insert pocket between the upper and the lower sides. The projections are shaped in the form of ridges which extend along the entire longitudinal direction of the cutting insert and the recesses are shaped in the form of grooves, which extend along the entire longitudinal direction of the cutting insert pocket. A gap is formed between a crest of the ridge and a bottom of its respective groove. The first flank angle lies in the interval of 120° to 160° and the second flank angle lies in the interval of 40° to 80°, preferably 55° to 60°. A gap is provided between a crest of the ridge and a bottom of the groove and the ridges describe a substantially sinusoidal curve while the grooves describe a substantially trapezoidal path in cross section. The lower surface of the cutting insert is somewhat concave in the longitudinal direction of the cutting insert. The height of the ridge is 50% to 95%, of the depth of the groove and the numbers of cooperating grooves and ridges are equal, namely from 2 to 10 pieces.

The invention further relates to a cutting insert for chip removing machining preferably for grooving or slot milling including an upper surface, a lower surface, as well as connecting side surfaces, wherein a line of intersection between a side surface and the upper surface forms a cutting edge or wherein two lines of intersection between the side surfaces and the upper surface form two cutting edges. The cutting insert is provided to be firmly clamped in a cutting insert pocket between an upper and a lower side. The upper surface of the cutting insert has first surfaces, which in cross section define a first flank angle and the lower surface of the cutting insert has second surfaces, which define a second flank angle. The first flank angle is larger than the second flank angle and the lower surface of the cutting insert comprises projections whose flanks constitute the lower support surfaces of the cutting insert. The projections are shaped in the form of ridges which extend along the entire longitudinal direction of the cutting insert. The first flank angle lies in the interval of 120° to 160° and the second flank angle lies in the interval of 40° to 80°, preferably 55° to 60°. The upper side of the cutting insert is provided with two longitudinal recesses or recesses.

DETAILED DESCRIPTION OF PREFERRED EMBODIMENTS OF THE INVENTION

With reference to FIGS. 1–8 there is shown a tool 10, including a holder 11 and a cutting insert 12. The holder 11 is of the type where an arm 13 constitutes an upper side 15 of the insert pocket 14. The arm is movable by means of a slot 16 being provided to terminate in the cutting insert pocket. The slot extends in the longitudinal direction of the cutting insert, an appropriate distance, past a screw 17 influencing the arm. An abutment surface 34 is provided in connection with the lower border line of the slot 16, wherein the surface 34 constitutes a stop for the cutting insert in its longitudinal direction. The upper side 15 is of conventional geometry, that is, it has a general V-shape with flanks 15A, 15B converging towards the cutting insert. The flanks form a obtuse, inner angle δ with each other, which lies in the interval 120° to 160°. A clearance surface is provided between the flanks in order to avoid a central contact with the cutting insert. The arm is intended to clamp the cutting insert against the lower side 19 of the cutting insert pocket. The lower side is formed with a number of separate, identical grooves 26, which in cross section describe a substantially trapezoidal path. The grooves are elongated and extend along the entire lower side 19, in the line R, where said line essentially coincides with the bottom 27 of the groove, for example. The line R substantially coincides with the direction F, which is the feed direction when the tool is used as a parting tool. By "substantially" is here meant that the angle β between the line R and the direction F can be 0° to +30°. The line R forms an angle σ with the direction L, which is the feed direction when the tool is used as a tool for longitudinal turning. The angle σ can be 90°±15°. The groove 26 further has two flanks 28A, 28B, which connect to the bottom 27, via a sharp or rounded transition. The flanks form an acute angle α with each other. The angle α lies in the interval of 40° to 80°, preferably 55° to 60°. A planar surface 29A, 29B is provided on each side of the groove 26 each of which adjoins the connected flank via an obtuse inner, soft or sharp, transition. The number of grooves 26 depends on the width of the cutting insert in the direction of the insert edge 24, wherein the number is chosen in the interval of 2 to 10 grooves. The groove has a depth d and a largest width z. The bottom can alternatively be described with a radius of about 0.2 to 0.4 mm.

Figure 1:
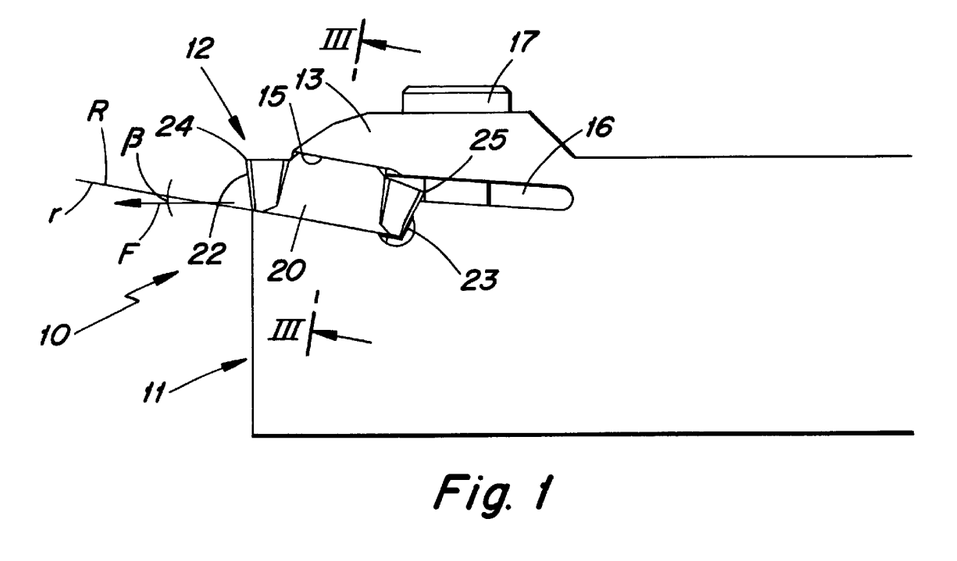
FIG. 1 shows a tool according to the present invention, in a side view.
Figure 2:
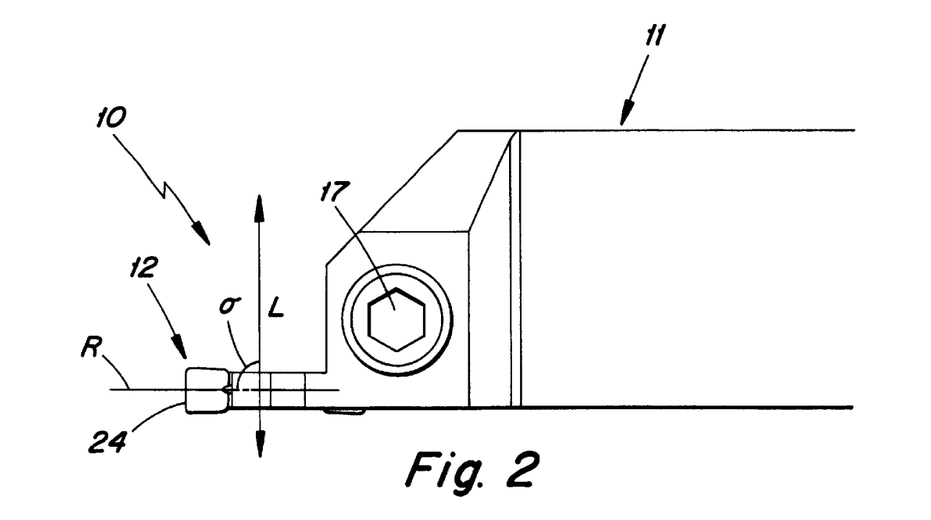
FIG. 2 shows the tool in a top view.
Figure 3:
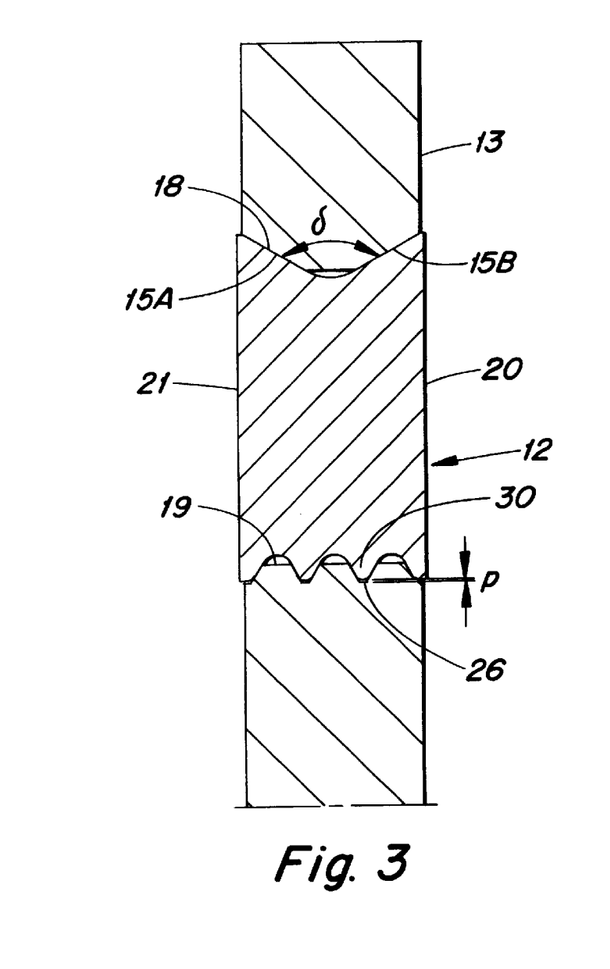
FIG. 3 shows a cross section according to the line III—III in FIG. 1.
Figure 4:
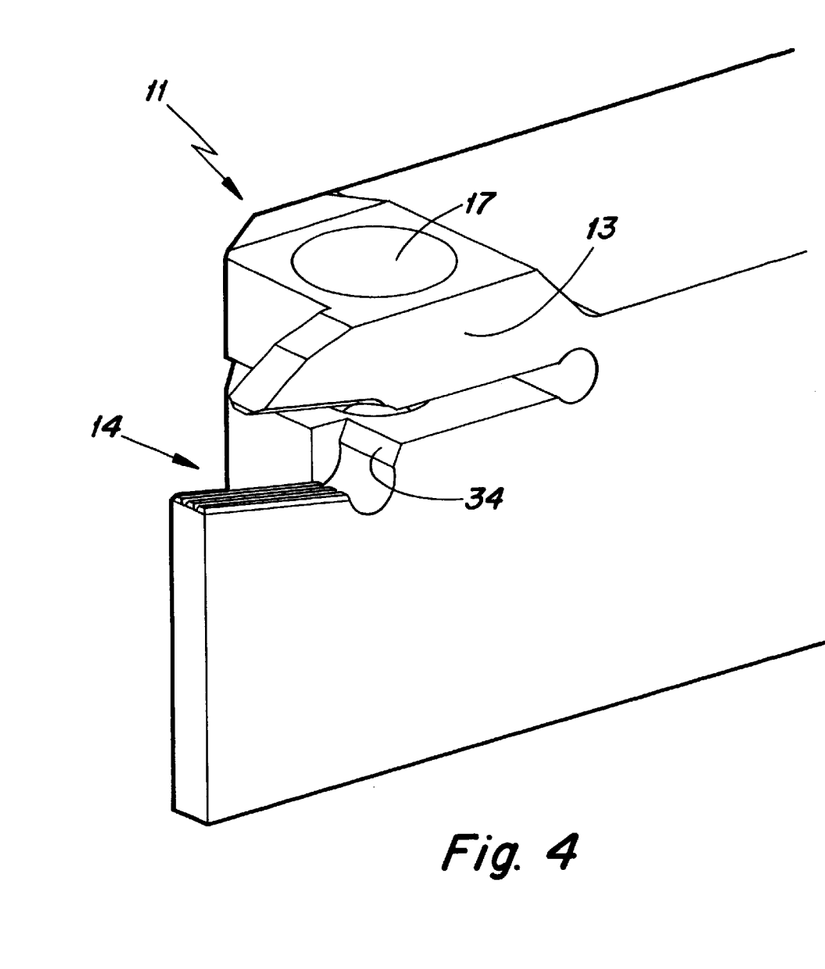
FIG. 4 shows a holder in a top, side perspective view.
Figure 5:
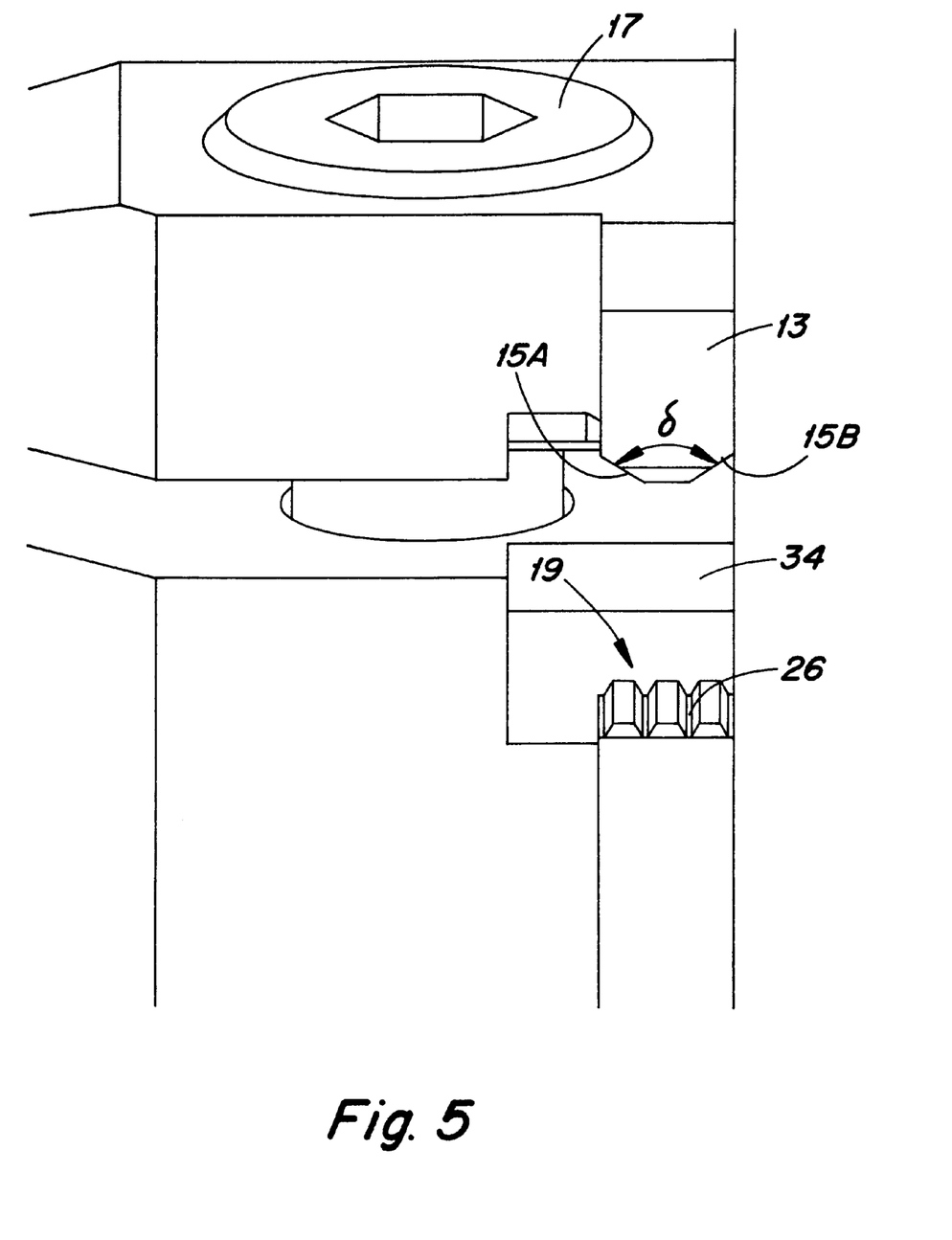
FIG. 5 shows a holder in a top, front perspective view.
Figure 6:
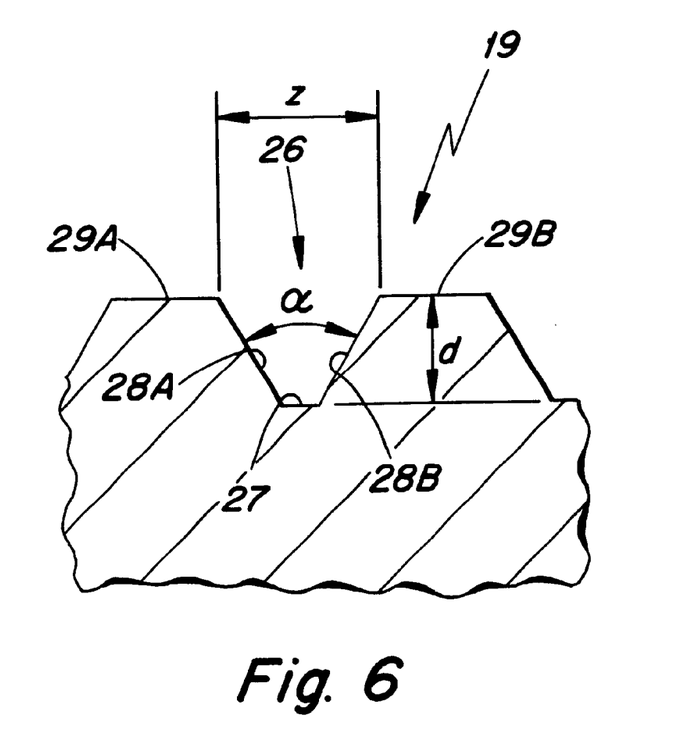
FIG. 6 shows an enlarged cross section of the lower surface of the insert pocket.
Figure 7:
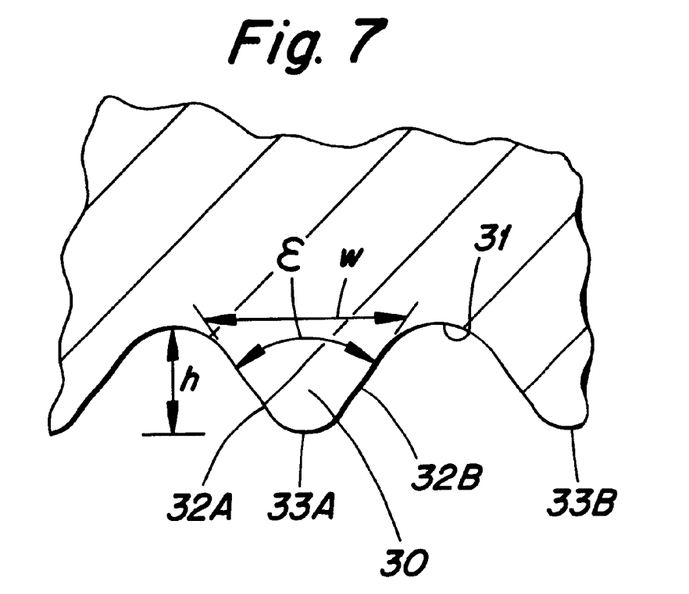
FIG. 7 shows an enlarged cross section of the upper surface of the insert pocket.
Figure 8:
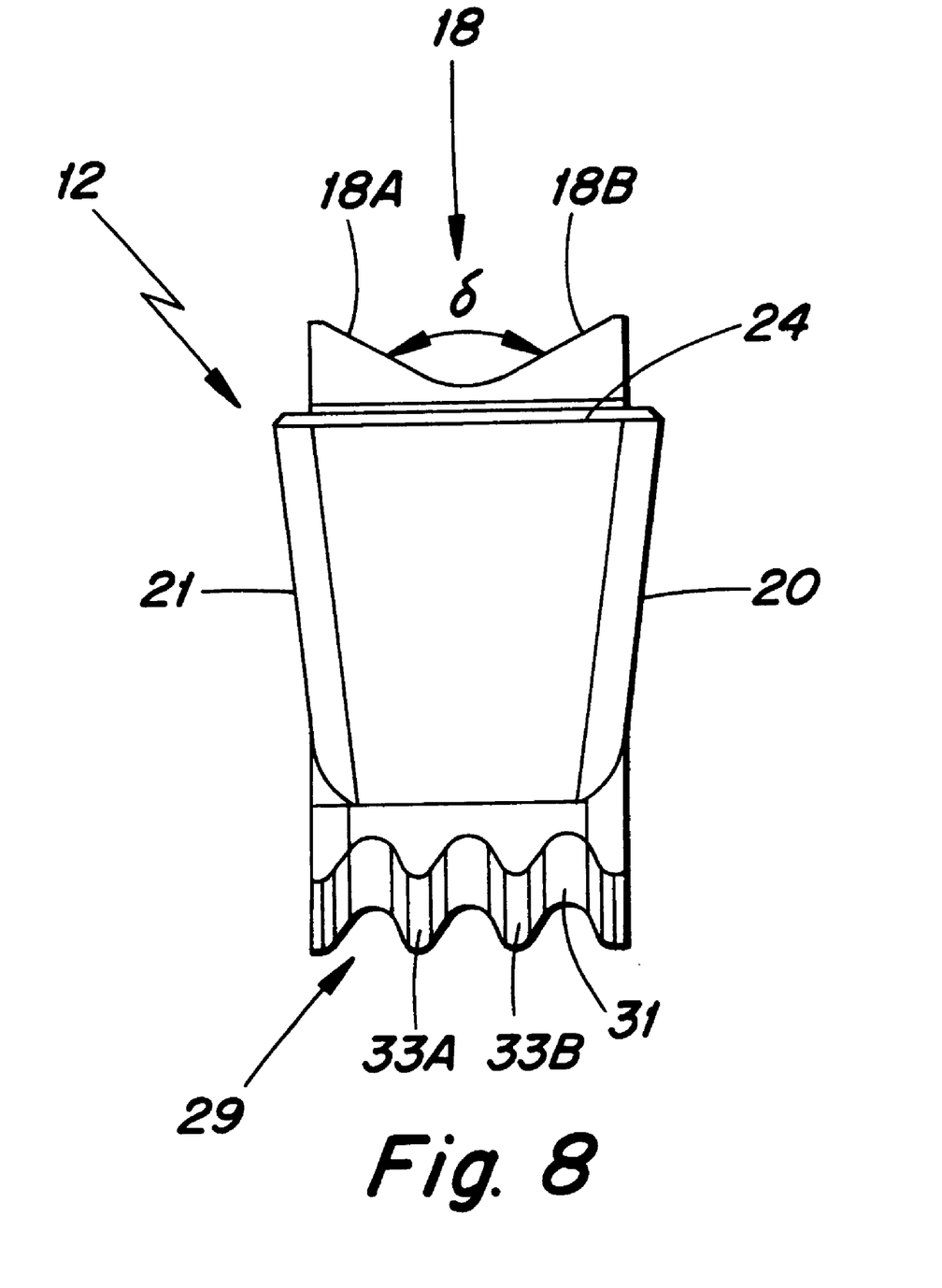
FIG. 8 shows a cutting insert according to the present invention in a perspective view from below.

The cutting insert 12 comprises an upper surface 18, a lower surface 29 as well as side surfaces 20, 21, 22, 23 connecting them, wherein the lines of intersection between the side surfaces 22, 23 and the upper surface 14 form cutting edges 24, 25. The cutting insert is preferably somewhat wider than the cutting insert pocket, for the sake of clearance. The length of the insert edge 24 is shorter than the height of the cutting insert between upper and lower surfaces 18, 29. The upper surface has two flanks 18A, 18B, which converge towards the lower surface 29 at an external angle substantially corresponding to the above-mentioned angle δ as seen in the cross sectional plane III—III which is oriented parallel to the cutting edge 24 (see FIGS. 1 and 3). The lower side is formed by a number of separate, substantially, identical ridges 30. The ridges form a substantially sinusoidal curve in the cross section according to FIG. 3, which oscillates about a line which substantially lies in the planar surfaces 29A, 29B. The ridges are elongated and extend along the entire lower side 29, in the line r, where said line coincides for example with of the bottom 31 of the ridge. The line r substantially coincides with the direction F, such as described above. The line r form an angle σ with the direction L, such as described above. The angle σ can be 90°±15°. The ridge 30 has two flanks 32A, 32B, which touch and connect to the bottom 31. The bottom can be described by a radius of about 0.2 to 0.4 mm. The flanks form an acute angle ε with each other. The angle ε lies in the interval of 40° to 80°, preferably between 55° and 60°. A crest or a curved surface 33A, 33B is provided on each sides of the ridge 30. Each surface touchingly connects to the flank via a radiussed transition. The ridge has a height h and a biggest width w. The number of ridges 30 depends of the insert width in the direction of the insert 24 edge and is chosen from 2 to 10.

The height of the ridge is 50% to 95% of the groove 26 depth and the largest width w of the ridge is larger than that the largest width z of the groove. This means that gap p (FIG. 3) exists between the crest 33A and the bottom 27 when the cutting insert is mounted in the holder. The gap ensures that the flanks engage each other and that the bottom does not support the cutting insert, and therefore tilting is avoided.

Mounting of the cutting insert 12 in the holder 11 takes place as follows. When the screw 17 is untightened, the cutting insert pocket 14 is widened by releasing induced elastic energy in the arm 13. In doing so, the cutting insert can be aligned with the holder and is brought into contact such that connected ridges 30 and grooves 26 come into engagement with each other. Subsequently the cutting insert is inserted, while guided by that mentioned engagement, until the insert inner edge surface 23 abuts against the abutment surface 34. Subsequently the screw 17 can be activated such that the flanks 15A, 15B of the arm 13 abut against connected flanks 18A, 18B on the cutting insert, whereby the ridges are firmly pressed against the grooves. When loosening the insert, the procedure is reversed.

Through the cooperation of the ridges and the grooves an interaction of the forces can be derived at each contact surface, where the cooperation of the flanks takes place, according to $$T'=m*P/\sqrt{3}$$

when α is 60° and δ is 120° and where T' is the shear force on the flank, μ is the coefficient of friction and P is the resultant force. For example, for a cutting insert with 4 mm length of the cutting edge and with six contact surfaces the obtained total shear force is $T'_{tot}=6*\mu* P/\sqrt{3}\approx 3,5\mu P$ to be compared with conventional tools where $T'_{tot}=\mu P$. In other words the present invention entails that the cutting insert has a resistance against extraction from the cutting insert pocket of about 3.5 times larger than that of conventional cutting inserts. Furthermore the tool according to the present invention gives a better stability against twisting compared to that of the conventional tools having cooperating V-profiles. This is caused by the steep flank angle which can be used since the present invention requires relatively great lift of the arm 13 before twisting can arise. In one case the twisting was reduced by ⅔ with a cutting insert according to the present invention. Tolerance faults or tiltings of the arm are avoided by a cutting insert according to the present invention, due to the more favorable interaction of the forces compared to a conventional cutting insert. The overall height can be reduced maintaining the same strength of the cutting insert and with the same amount of cemented carbide. Since the clamping force of the arm 13 is spread over a larger surface, the risk for splitting of the insert lower surface 29 is reduced.

Furthermore it has been proven beneficial to make the insert lower surface 29 somewhat concave in the longitudinal direction of the cutting insert in order to guarantee abutment at the forward and rear portions of the surface 29.

Figure 9:
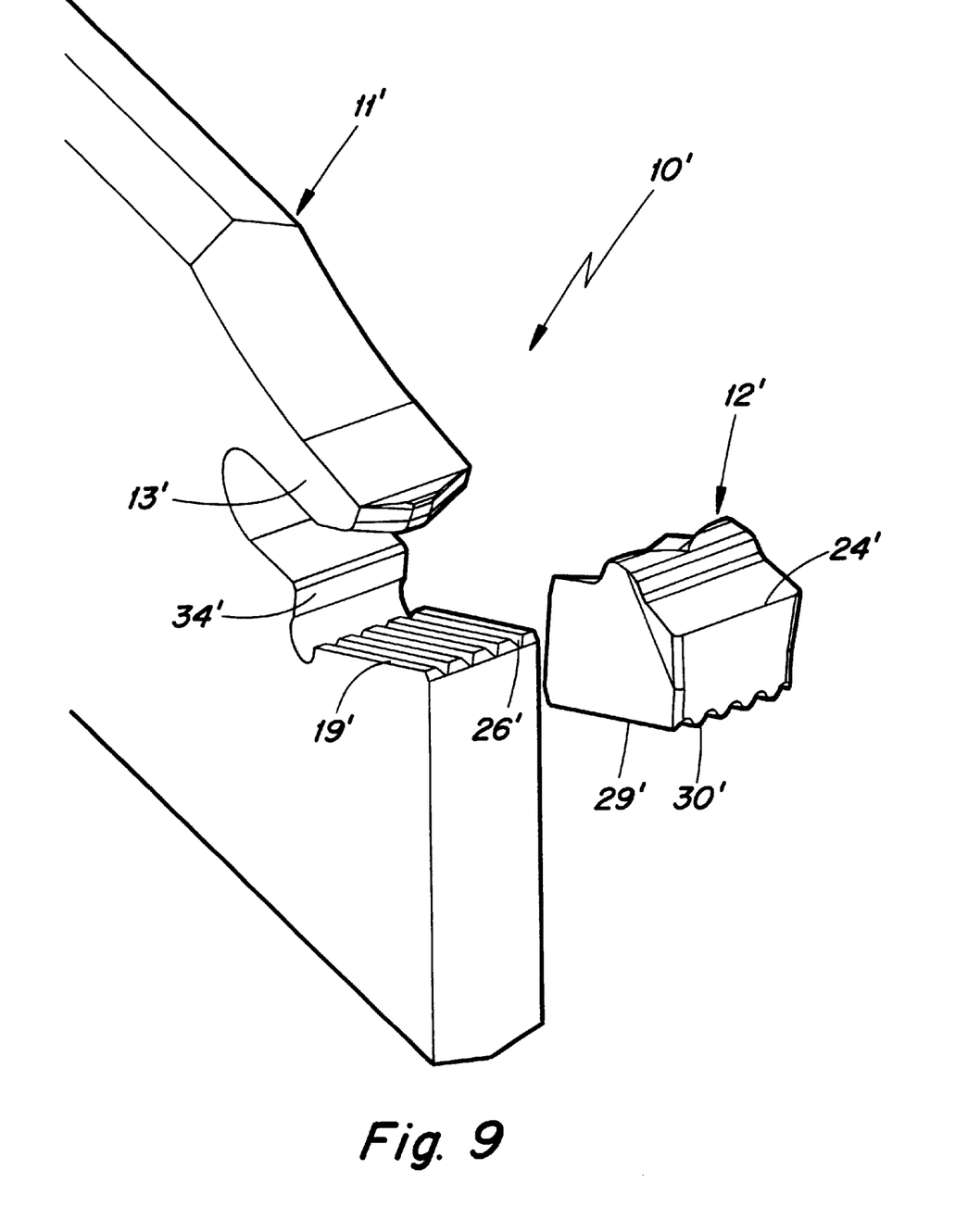
FIG. 9 shows a first alternative embodiment of a tool according to the present invention in an exploded perspective view.

In FIG. 9 is shown an alternative embodiment of a tool 10' according to the present invention, wherein the holder 11' is provided with a plate intended to be fastened in a block, not shown. The cutting insert 12' is clamped by an arm integral with the plate in the way as described in U.S. Pat. No. 4,588,333, which is hereby incorporated by reference. The lower surface 29' of the cutting insert and the lower side 19' of the cutting insert pocket comprise cooperating ridges 30' and grooves 26', such as they are described above.

Figure 10:
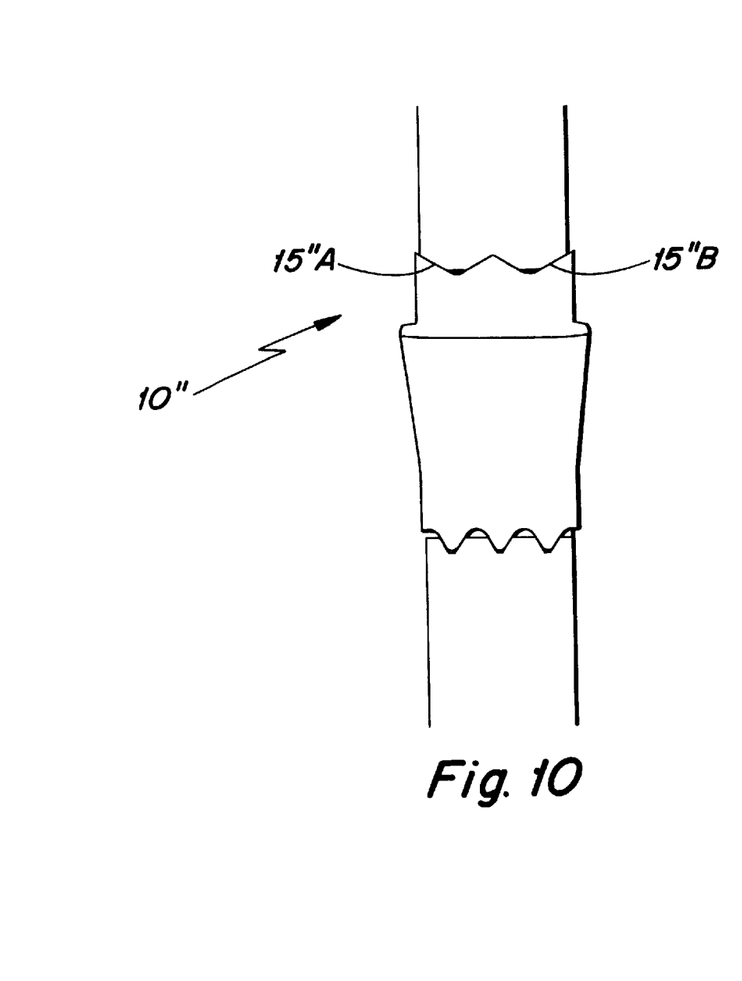
FIG. 10 shows a front view of a second alternative embodiment of a tool according to the present invention.
Figure 11:
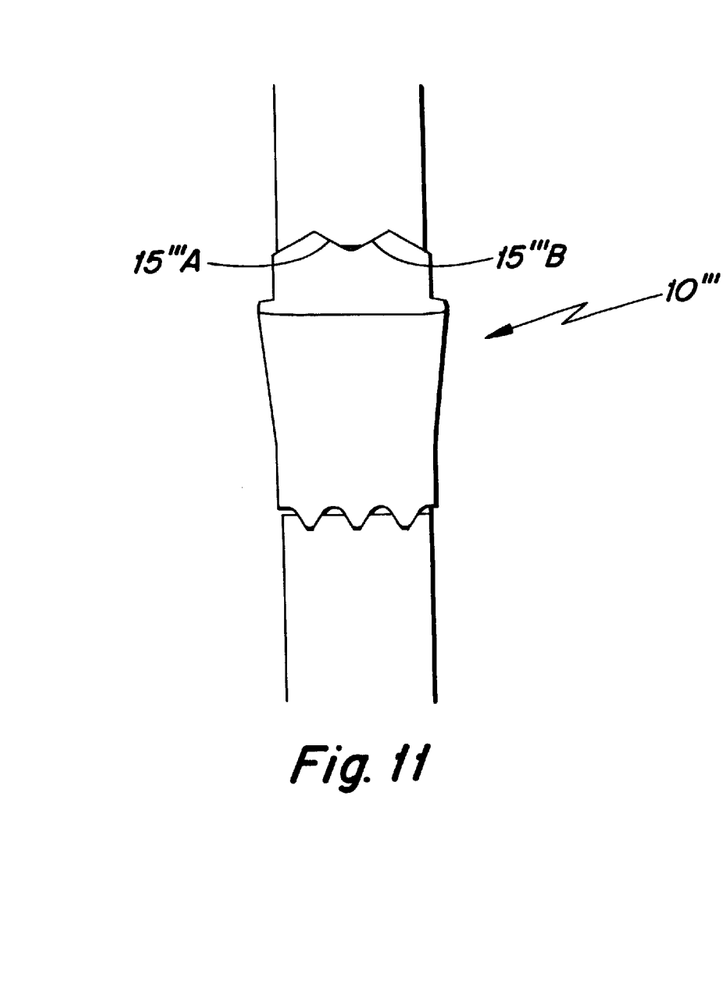
FIG. 11 shows a front view of a third alternative embodiment of a tool according to the present invention.

In FIGS. 10 and 11 are shown alternative embodiments of a tool 10", 10''' according to the present invention, wherein the upper side rather than a V-shape now has a W-shape (FIG. 10) or M-shape (FIG. 11). These forms have been developed in the first case according to FIG. 10, to provide, at the upper side, two longitudinal projections on the holder and corresponding recesses in the cutting insert 12" and in the second case according to FIG. 11, to provide two side-by-side longitudinal recesses on the holder and corresponding projections in the cutting insert 12'''. Here it is important to position recesses and projections at the upper side in such a manner relative to recesses and projections at the lower contact surfaces, that the cutting insert cannot be inserted into the holder in an erroneous manner, i.e. the respective partition results in that there is only one possible way to insert the cutting insert into the holder and it is in the correct manner. The W- and M-shapes according to FIG. 10 and 11, respectively, mean that the flanks 15"A, 15"B respective 15'''a and 15'''b converging towards the cutting insert, each of which forming a blunt, inner angle with each other, which angle lies in the interval of 120° to 160°. The lower support surfaces are designed such as shown and described above.

It is understood that the geometries for the cooperating ridges and grooves can be varied within the scope of the present invention without departing from the scope of the invention. Consequently the geometries may assume most thread cross sections (however with a degree of overlap of max 95%), for example trapezoid on both cooperating surfaces. It is even possible that one or more central crests 33A are displaced in height direction relative to the surrounding crest in order to create a generally seen, in the lateral direction, concave or convex underside on the cutting insert, while the holder is provided with complementary surfaces. The invention can be used also for slot mills. The cutting insert, including the lower surface 29, 29', is preferably coated with layers of for example Al2O3, TiN and/or TiCN.

What is claimed is:

1. Tool for chip removing machining, including a holder and a cutting insert, said holder comprising a body forming at least one cutting insert pocket having an upper side and a lower side, said upper and lower sides both being of one-piece integral construction with said body, said cutting insert comprising an upper surface and a lower surface, the upper surface including a cutting edge, one of the upper side and the upper surface forming a protrusion, and the other of the upper side and the upper surface forming a depression receiving the protrusion, the protrusion and the depression together defining an interface, the depression including a bottom, and the protrusion including a crest facing the bottom, the bottom and the crest extending in a direction oriented transversely relative to the cutting edge, as the insert is viewed in a direction toward the top surface, to prevent movement of the insert relative to the holder in a direction parallel to the cutting edge; the protrusion including contact surfaces converging at a first flank angle toward the bottom of the depression, the first flank angle being greater than zero and less than 180 degrees, the lower side of the pocket and the lower surface of the cutting insert comprising intermeshing projections and recesses; each recess forming a bottom, and each projection forming a crest facing a respective bottom, the bottoms and the crests of the recesses and projections extending in a direction oriented transversely relative to the cutting edge as the insert is viewed in a direction toward the top surface, to prevent movement of the insert relative to the holder in a direction parallel to the cutting edge, each of the projections including contact surfaces converging at a second contact angle toward the floor of a respective recess; each of the second flank angles being greater than zero and less than 180 degrees, the first flank angle being larger than the second flank angle.

2. The tool according to claim 1, wherein a gap being disposed between a crest of each projection and a bottom of its respective recess.

3. The tool according to claim 2, wherein a height of each projection is 50% to 95% of a depth of a respective recess, the number of recesses being equal to the number of cooperating projections, the number being from 2 to 10.

4. The tool according to claim 1, wherein the first flank angle lies in a range of 120° to 160° and the second flank angle lies in a range of 40° to 80°.

5. The tool according to claim 4, wherein the range of the second flank angle is 55° to 60°.

6. The tool according to claim 4, wherein each projection discloses a substantially sinusoidal curve in cross section, the recesses describing a substantially trapezoidal path in cross section, the lower surface of the cutting insert being generally concave in the longitudinal direction of the cutting insert.

7. Cutting insert for chip removing machining, comprising an upper surface, a lower surface and side surfaces interconnecting the upper and lower surfaces, a line of intersection between the upper surface and one of the side surfaces forming a cutting edge; the cutting insert adapted to be firmly clamped in a cutting insert pocket between upper and lower sides thereof; the upper surface of the cutting insert having first surfaces which converge toward one another as seen in a cross sectional plane oriented parallel to the cutting edge to form a first flank angle greater than zero and less than 180 degrees; the lower surface of the cutting insert comprising projections, each projection defining a second flank angle as seen in the cross section, the second flank angle being greater than zero and less than 180 degrees; the first flank angle being larger than the second flank angle; the projections constituting lower support surfaces of the cutting insert.

8. The cutting insert according to claim 7, wherein the projections extend along an entire longitudinal dimension of the cutting insert.

9. The cutting insert according to claim 7, wherein the first flank angle lies in a range of 120° to 160°, and the second flank angle lying in a range of 40° to 80°.

10. The cutting insert according to claim 9, wherein the second flank angle lies in a range of 55° to 60°.

11. The cutting insert according to claim 7, wherein the first surfaces together form a first recess in the upper surface, the upper surface further including a second recess extending in side-by-side relationship to the first recess.

* * * * *